United States Patent
Alkhaldi et al.

(10) Patent No.: US 12,221,882 B2
(45) Date of Patent: Feb. 11, 2025

(54) REMOTE DETECTION TECHNOLOGY BASED APPARATUS AND METHODOLOGY FOR MINIATURIZED SENSOR RECOVERY

(71) Applicant: SAUDI ARABIAN OIL COMPANY, Dhahran (SA)

(72) Inventors: Yara H. Alkhaldi, Dhahran (SA); Abdullah Alabdulkarim, Dhahran (SA); Fawaz M. Albahesh, Dammam (SA); Faisal Alghamdi, Dhahran (SA); Bodong Li, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/342,382

(22) Filed: Jun. 27, 2023

(65) Prior Publication Data
US 2025/0003334 A1   Jan. 2, 2025

(51) Int. Cl.
| | | |
|---|---|---|
| *E21B 21/06* | (2006.01) | |
| *E21B 47/26* | (2012.01) | |
| *G06K 7/10* | (2006.01) | |
| *G06K 19/07* | (2006.01) | |

(52) U.S. Cl.
CPC ............ *E21B 47/26* (2020.05); *E21B 21/065* (2013.01); *G06K 7/10366* (2013.01); *G06K 19/0709* (2013.01); *G06K 19/0723* (2013.01)

(58) Field of Classification Search
CPC .............................. E21B 21/065; E21B 21/063
USPC ................................................... 175/42, 41
See application file for complete search history.

(56) References Cited

U.S. PATENT DOCUMENTS

| | | | | |
|---|---|---|---|---|
| 2,659,046 | A * | 11/1953 | Arps | G01V 5/08 |
| | | | | 175/48 |
| 7,484,625 | B2 * | 2/2009 | Scott | E21B 21/065 |
| | | | | 209/404 |
| 8,172,007 | B2 * | 5/2012 | Dolman | E21B 47/11 |
| | | | | 166/250.11 |

(Continued)

FOREIGN PATENT DOCUMENTS

WO   2020236507 A1   11/2020

OTHER PUBLICATIONS

International Search Report issued for corresponding international patent application No. PCT/US2024/034957, mailed Oct. 4, 2024 (6 pages).

(Continued)

*Primary Examiner* — Kenneth L Thompson
(74) *Attorney, Agent, or Firm* — Osha Bergman Watanabe & Burton LLP

(57) ABSTRACT

A system includes a drilling microchip, a mud return line, a microchip detector, and a computer system. The drilling microchip has an identifier and configured to be pumped into the drill string and up the annulus using the drilling fluid to obtain data about the well. The mud return line is hydraulically connected to the annulus of the well and a shale shaker. The microchip detector is connected to the shale shaker and has a detection range. The microchip detector is configured to interact with the identifier to indicate a presence of the drilling microchip in the detection range. The computer system is electronically connected to the microchip detector. The microchip detector is configured to send a signal to the computer system upon indication of the presence of the drilling microchip.

15 Claims, 6 Drawing Sheets

(56) References Cited

U.S. PATENT DOCUMENTS

| | | | |
|---|---|---|---|
| 8,627,902 B2* | 1/2014 | Hammer | E21B 21/08 |
| | | | 175/42 |
| 9,366,099 B2* | 6/2016 | Ly | E21B 21/08 |
| 9,488,019 B1* | 11/2016 | Rowe | E21B 7/00 |
| 10,428,606 B2* | 10/2019 | Al-Badran | E21B 43/10 |
| 10,648,257 B2* | 5/2020 | Bingham | B07B 1/46 |
| 10,662,759 B2* | 5/2020 | Shi | E21B 47/06 |
| 11,688,172 B2* | 6/2023 | Ruel | G06V 10/764 |
| | | | 382/103 |
| 11,692,440 B2* | 7/2023 | Wang | E21B 47/11 |
| | | | 166/250.12 |
| 2008/0316049 A1 | 12/2008 | Verret et al. | |
| 2016/0160640 A1 | 6/2016 | Graves et al. | |
| 2017/0175511 A1 | 6/2017 | Galliano et al. | |
| 2017/0356287 A1 | 12/2017 | Roddy | |
| 2017/0370211 A1 | 12/2017 | Galliano et al. | |
| 2021/0107033 A1* | 4/2021 | Vos | E21B 21/06 |
| 2021/0123341 A1 | 4/2021 | Jabari et al. | |

OTHER PUBLICATIONS

Written Opinion issued for corresponding international patent application No. PCT/US2024/034957, mailed Oct. 4, 2024 (10 pages).

Z. Zhu, et al., "Measurements During Drilling Through an Innovative Microchip Technology to Determine Accurate Wellbore Properties for Efficient Drilling Operations," SPE-205899-MS, Society of Petroleum Engineers, 2021 SPE Annual Technical Conference and Exhibition held in Dubai, UAE, 2021 (13 pages).

* cited by examiner

REMOTE DETECTION TECHNOLOGY BASED APPARATUS AND METHODOLOGY FOR MINIATURIZED SENSOR RECOVERY

BACKGROUND

Hydrocarbons are located in porous rock formations beneath the surface of the Earth. Wells are drilled into these formations to access and produce the hydrocarbons. Wells are drilled using a drill string having a drill bit. The drill string breaks away rock and drilling fluid removes the rock from the reservoir. Wells are supported by casing strings cemented in place in the wellbore. In order to safely and effectively drill and case a well, downhole data acquisition is required. Downhole data is acquired in a myriad of ways, however, current methods of obtaining downhole data are deficient. For example, current methods are used to estimate the data, are performed after a section of the well has been drilled, or only measure near-bit depth data.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure presents, in accordance with one or more embodiments methods and systems for a well having a drill string, an annulus, and a drilling fluid. The system includes a drilling microchip, a mud return line, a microchip detector, and a computer system. The drilling microchip has an identifier and configured to be pumped into the drill string and up the annulus using the drilling fluid to obtain data about the well. The mud return line is hydraulically connected to the annulus of the well and a shale shaker. The microchip detector is connected to the shale shaker and has a detection range. The microchip detector is configured to interact with the identifier to indicate a presence of the drilling microchip in the detection range. The computer system is electronically connected to the microchip detector. The microchip detector is configured to send a signal to the computer system upon indication of the presence of the drilling microchip.

The method includes pumping a drilling microchip, having an identifier, into the drill string and up the annulus of the well using the drilling fluid, measuring and storing data about the well using the drilling microchip, and pumping the drilling microchip out of the well to a shale shaker using a mud return line. The method further includes indicating a presence of the drilling microchip in a detection range of a microchip detector by having an interaction between the microchip detector and the identifier, wherein the microchip detector is connected to the shale shaker and sending a signal from the microchip detector to a computer system upon indication of the presence of the drilling microchip.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
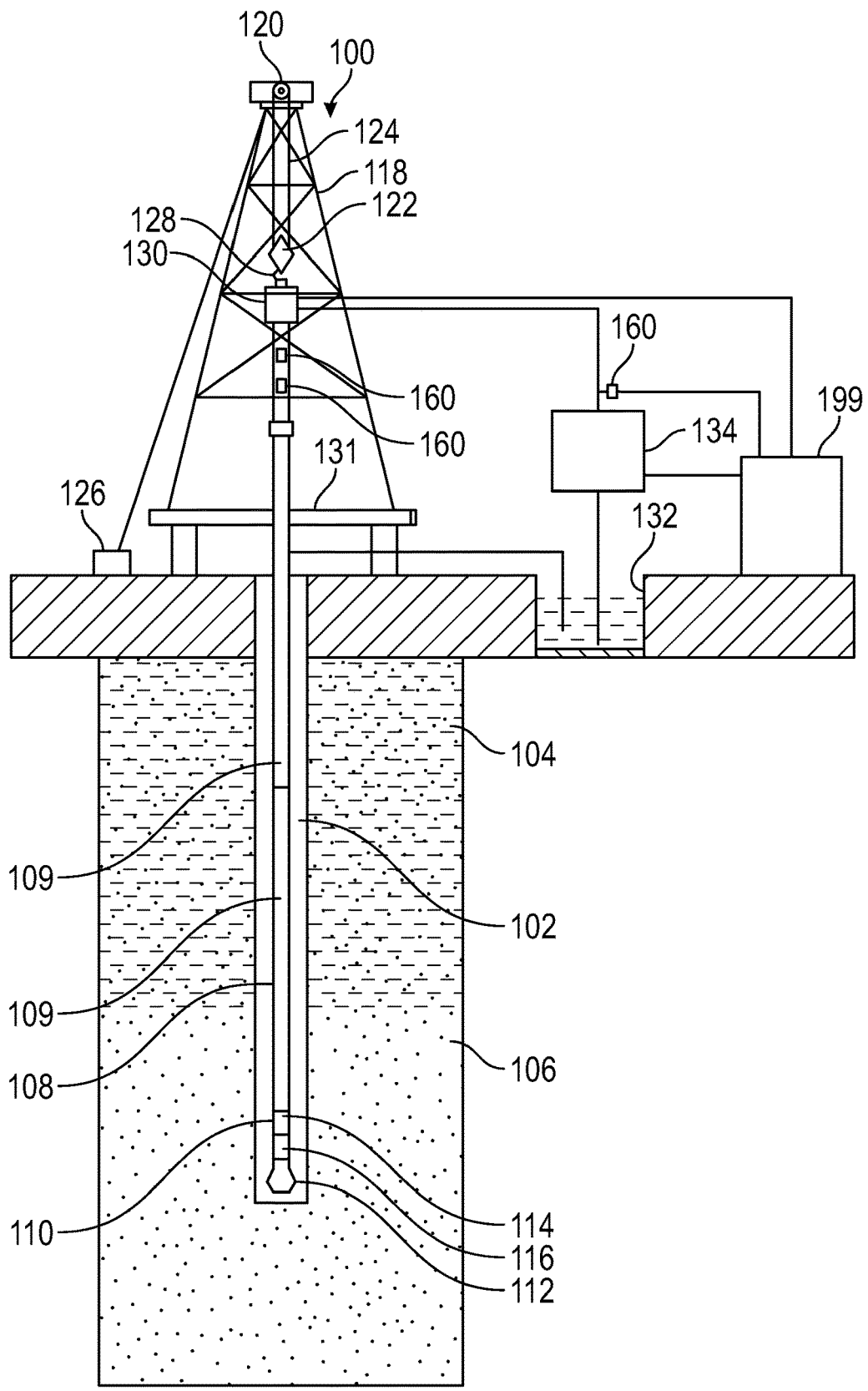
FIG. 1 shows an example well site in accordance with one or more embodiments.

FIG. 1 shows an example well site (100) in accordance with one or more embodiments. In general, well sites may be configured in a myriad of ways. Therefore, well site (100) is not intended to be limiting with respect to the particular configuration of the drilling equipment. The well site (100) is depicted as being on land. In other examples, the well site (100) may be offshore, and drilling may be carried out with or without use of a marine riser. A drilling operation at well site (100) may include drilling a wellbore (102) into a subsurface including various formations (104, 106). For the purpose of drilling a new section of wellbore (102), a drill string (108) is suspended within the wellbore (102).

The drill string (108) may include one or more drill pipes (109) connected to form conduit and a bottom hole assembly (BHA) (110) disposed at the distal end of the conduit. The BHA (110) may include a drill bit (112) to cut into the subsurface rock. The BHA (110) may include measurement tools, such as a measurement-while-drilling (MWD) tool (114) and logging-while-drilling (LWD) tool 116. Measurement tools (114, 116) may include sensors and hardware to measure downhole drilling parameters, and these measurements may be transmitted to the surface using any suitable telemetry system known in the art. Herein, the term surface is defined as any location located outside of the wellbore (102), such as somewhere on the Earth's surface, on a man-made object located on the Earth's surface, etc. The BHA (110) and the drill string (108) may include other drilling tools known in the art but not specifically shown.

The drill string (108) may be suspended in wellbore (102) by a derrick (118). A crown block (120) may be mounted at the top of the derrick (118), and a traveling block (122) may hang down from the crown block (120) by means of a cable or drilling line (124). One end of the cable (124) may be connected to a drawworks (126), which is a reeling device that may be used to adjust the length of the cable (124) so that the traveling block (122) may move up or down the derrick (118). The traveling block (122) may include a hook (128) on which a top drive (130) is supported.

The top drive (130) is coupled to the top of the drill string (108) and is operable to rotate the drill string (108). Alternatively, the drill string (108) may be rotated by means of a rotary table (not shown) on the drilling floor (131). Drilling fluid (commonly called mud) may be stored in a mud pit (132), and at least one pump (134) may pump the mud from the mud pit (132) into the drill string (108). The mud may flow into the drill string (108) through appropriate flow paths in the top drive (130) (or a rotary swivel if a rotary table is used instead of a top drive to rotate the drill string (108)).

In one implementation, a system (199) may be disposed at or communicate with the well site (100). System (199) may control at least a portion of a drilling operation at the well site (100) by providing controls to various components of the drilling operation. In one or more embodiments, system (199) may receive data from one or more sensors (160) arranged to measure controllable parameters of the drilling operation. As a non-limiting example, sensors (160) may be arranged to measure WOB (weight on bit), RPM (drill string rotational speed), GPM (flow rate of the mud pumps), and ROP (rate of penetration of the drilling operation).

Sensors (160) may be positioned to measure parameter(s) related to the rotation of the drill string (108), parameter(s) related to travel of the traveling block (122), which may be used to determine ROP of the drilling operation, and parameter(s) related to flow rate of the pump (134). For illustration purposes, sensors (160) are shown on drill string (108) and proximate mud pump (134). The illustrated locations of sensors (160) are not intended to be limiting, and sensors (160) could be disposed wherever drilling parameters need to be measured. Moreover, there may be many more sensors (160) than shown in FIG. 1 to measure various other parameters of the drilling operation. Each sensor (160) may be configured to measure a desired physical stimulus.

During a drilling operation at the well site (100), the drill string (108) is rotated relative to the wellbore (102), and weight is applied to the drill bit (112) to enable the drill bit (112) to break rock as the drill string (108) is rotated. In some cases, the drill bit (112) may be rotated independently with a drilling motor. In further embodiments, the drill bit (112) may be rotated using a combination of the drilling motor and the top drive (130) (or a rotary swivel if a rotary table is used instead of a top drive to rotate the drill string (108)). While cutting rock with the drill bit (112), mud is pumped into the drill string (108).

The mud flows down the drill string (108) and exits into the bottom of the wellbore (102) through nozzles in the drill bit (112). The mud in the wellbore (102) then flows back up to the surface in an annular space between the drill string (108) and the wellbore (102) with entrained cuttings. The mud with the cuttings is returned to the pit (132) to be circulated back again into the drill string (108). Typically, the cuttings are removed from the mud, and the mud is reconditioned as necessary, before pumping the mud again into the drill string (108). In one or more embodiments, the drilling operation may be controlled by the system (199).

In order to safely and effectively drill and case a wellbore (102), downhole data acquisition is required. Downhole data is acquired in a myriad of ways, however, current methods of obtaining downhole data are deficient. For example, current methods are used to estimate the data, are performed after a section of the wellbore (102) has been drilled, or only measure near-drill bit (112) depth data. The present disclosure outlines systems and methods that may be used to obtain downhole data of the entire well while the drill string (108) is drilling a wellbore (102).

Figure 2:
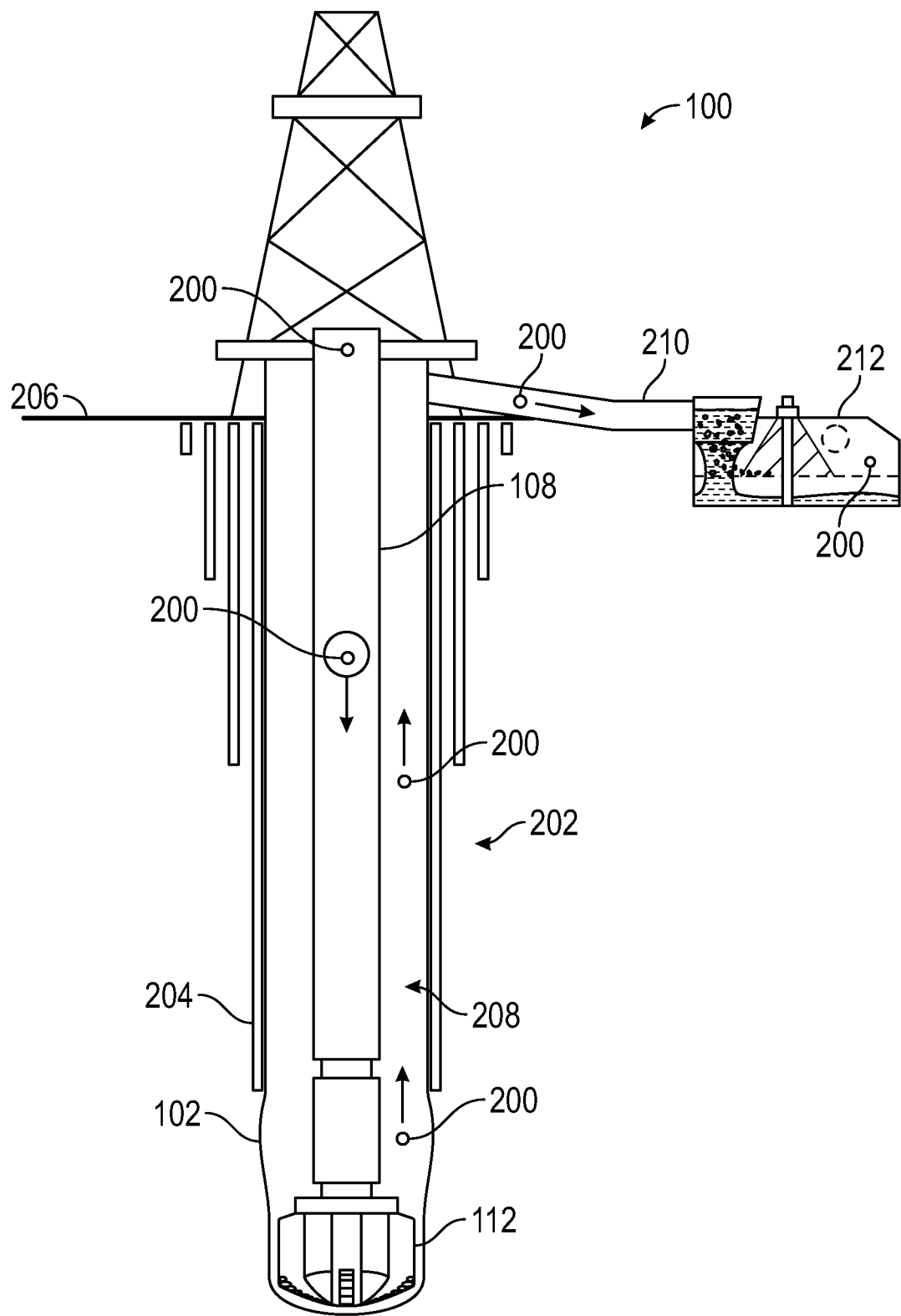
FIG. 2 shows the wellsite using a drilling microchip sensor system to measure and store downhole data of a well in accordance with one or more embodiments.

FIG. 2 shows the wellsite (100) using a drilling microchip (200) sensor system to measure and store downhole data of a well (202) in accordance with one or more embodiments. Specifically, FIG. 2 shows a flow path of a singular drilling microchip (200) at six different positions in the well (202). The well (202) may include the wellbore (102) and any casing strings (204) cemented in placed in the wellbore (102).

The drilling microchip (200) is pumped into the inside of the drill string (108) at a surface location (206). The surface location (206) is any location on or above the surface of the Earth, such as a floor of a drilling rig. The drilling microchip (200) is pumped into the inside of the drill string (108) using the drilling fluid. The drilling fluid may be pumped in the well (202) using one or more mud pumps (134).

The drilling microchip (200) is carried downhole through the drill string (108), out the bottom of the drill string (108) (such as through the nozzles of the drill bit (112)), and up the annulus (208) of the well (202). The annulus (208) is the space located between the outside of the drill string (108) and the inside of the well (202). The inside of the well (202) may be defined by the wellbore (102) wall or by the inside of a casing string (204) without departing from the scope of the disclosure herein.

The drilling microchip (200) exits the well (202) using the same fluid path the drilling fluid follows. In accordance with one or more embodiments, the drilling fluid and the drilling microchip (200) exit the annulus (208) of the well (202) using a mud return line (210) that is hydraulically connected to the annulus (208) of the well (202) and at least one shale shaker (212). As the drilling microchip (200) travels through the well (202), the drilling microchip (200) may measure and store downhole data.

The downhole data may include pressure data, temperature data, acoustic data, vibrational data, directional surveys, etc. The drilling microchip (200) may measure data for the entire length of the annulus (208) and the entire length of the drill string (108) as it is being pumped through the drill string (108). FIG. 2 shows only one drilling microchip (200) being pumped into the drill string (108), however, any number of drilling microchips may be used to obtain downhole data without departing from the scope of the disclosure herein.

Figure 3:
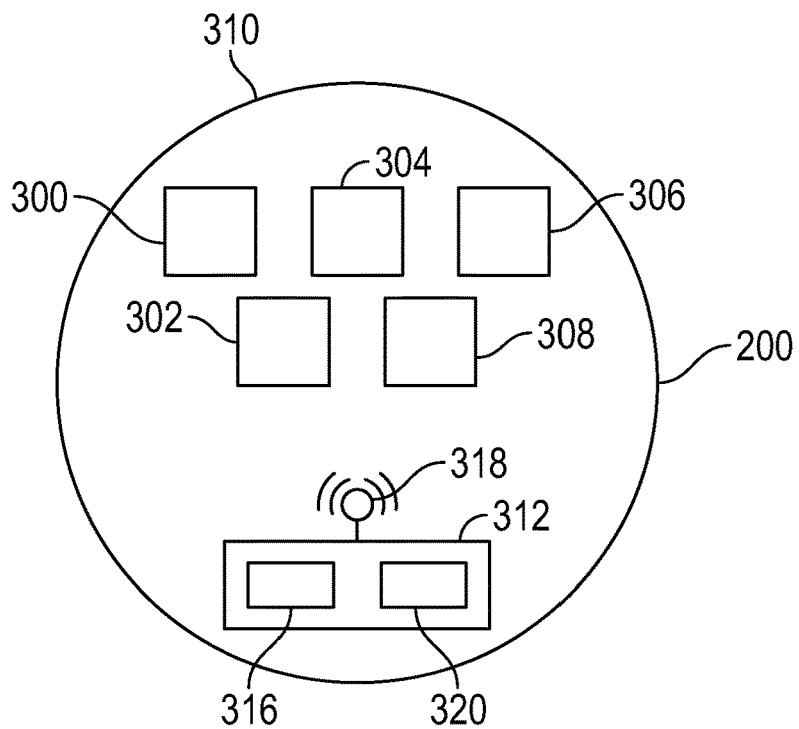
FIGS. 3 and 4 show the drilling microchip in accordance with one or more embodiments.
Figure 4:
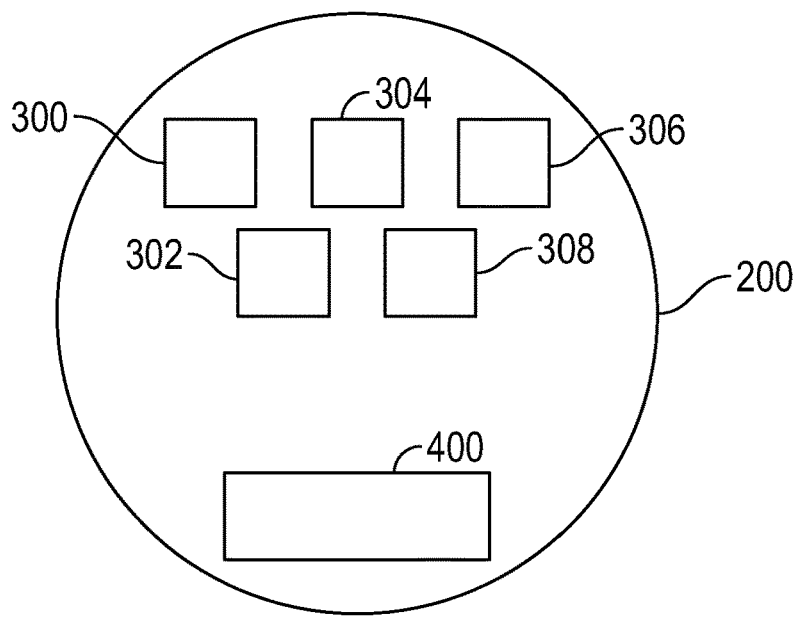

FIGS. 3 and 4 show the drilling microchip (200) in accordance with one or more embodiments. The drilling microchip (200) includes a microchip battery (300), one or more sensors (302), a microprocessor (304), a memory (306), a communication module (308), and an identifier. The drilling microchip (200) may have an outer shell (310) that cases and protects the aforementioned components of the drilling microchip (200).

The outer shell (310) may be in a spherical shape as shown in FIGS. 3 and 4 or the outer shell (310) may be any shape without departing from the scope of the disclosure herein. Furthermore, the outer shell (310) may be made of a material designed to withstand and protect the inner components from the harsh environments seen downhole.

The microchip battery (300) is used to store energy that may be used to power the other components of the drilling microchip (200). The sensors (302) are used to measure downhole data. The sensors (302) may include any type of sensor known in the art such as acoustic, pressure, vibration, accelerometers, gyroscopic, magnetometer, and temperature sensors.

The memory (306) is used to store the measurements gathered by the sensors (302). The microprocessor (304) is used to operate the drilling microchip (200), and the communication module (308) is used to communicate with an external device, such as a computer system (602) (outlined below in FIG. 6), to receive commands and relay the measurements.

The identifier is used to interact with a microchip detector (500) (further outlined in FIGS. 5a and 5b below) to detect the location or presence of the drilling microchip (200). The identifier may be a radio frequency identification (RFID) chip (312) as shown in FIG. 3 or the identifier may be an electronic tag (400) as shown in FIG. 4. The RFID chip (312) may include a circuit (316), an antenna (318), and a RFID chip battery (320). The operation of the RFID chip (312) and the electronic tag (400) are further outlined below in FIGS. 5a and 5b.

Figure 5A:
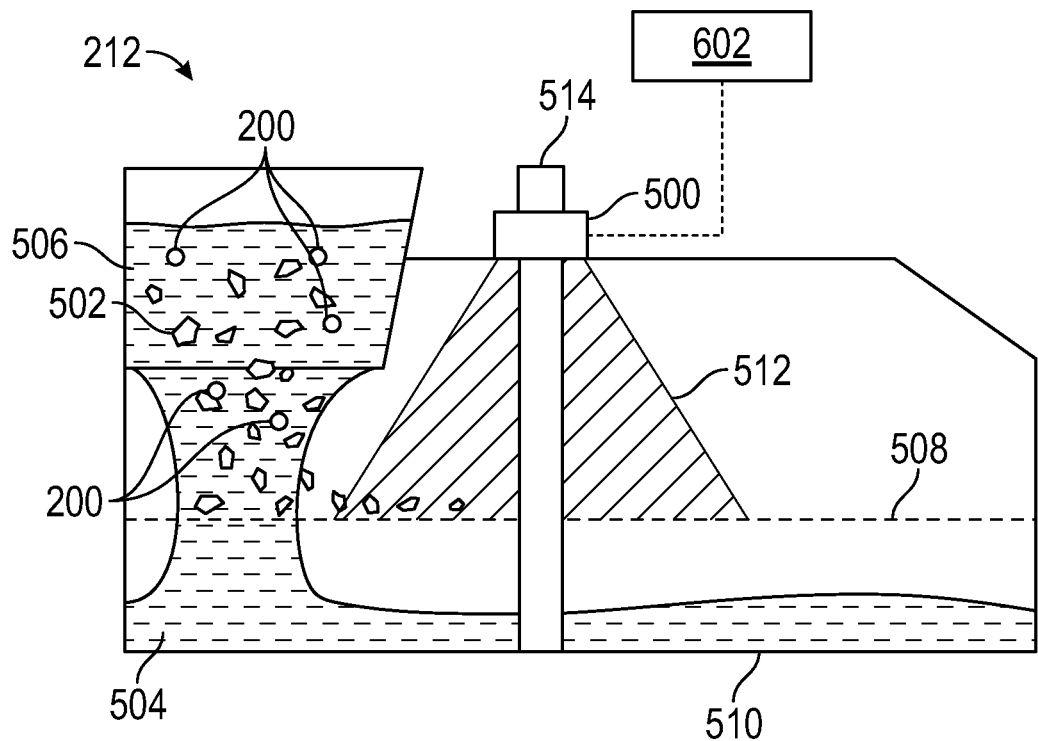
FIGS. 5a and 5b show a drilling microchip recovery system in accordance with one or more embodiments.
Figure 5B:
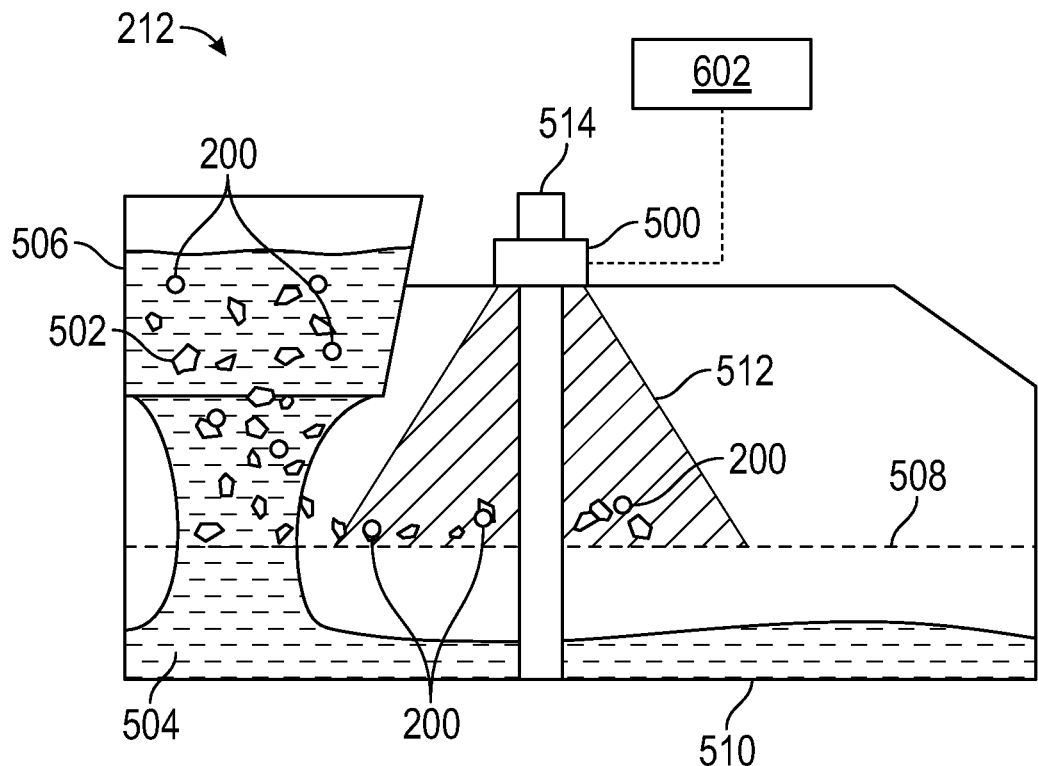

FIGS. 5a and 5b show a drilling microchip (200) recovery system in accordance with one or more embodiments. Components shown in FIGS. 5a and 5b that are the same as or similar to components shown in FIGS. 1-4 have not been redescribed for purposes of readability and have the same function and description as outlined above.

The drilling microchip (200) recovery system includes a microchip detector (500) connected to the shale shaker (212). The shale shaker (212) is a device used in drilling fluid processing that separates cuttings (502) from the drilling fluid (504). The shale shaker (212) includes a drilling fluid inlet (506) where the drilling fluid (504) containing the cuttings (502) and the drilling microchips (200) enter the shale shaker (212).

The cuttings (502) are the portions of rock that are drilled and removed from the subsurface to create the wellbore (102). The shale shaker (212) uses vibrations and screens (508) to separate the cuttings (502) from the drilling fluid (504). The drilling fluid (504) falls through the holes in the screens (508) to be collected in a hopper (510). The hopper (510) acts as a containment area for the drilling fluid (504). The hopper (510) may be connected to other drilling fluid processing equipment to further condition the drilling fluid (504).

The screens (508) are sized such that the majority of the cuttings (502) are unable to fall through into the hopper (510). The separated cuttings (502) fall off the end of the shale shaker (212) into a cuttings container (not pictured). The drilling microchips (200) are also large enough to avoid falling through the screens into the hopper (510) and also fall off of the end of the shale shaker (212) into the cuttings container.

The microchip detector (500) is configured to interact with the identifier in the drilling microchip (200) to indicate a presence of the drilling microchip (200) in a detection range (512) of the microchip detector (500). The microchip detector (500) may be electronically connected to a computer system (602). The microchip detector (500) may send a signal to the computer system (602) upon indication of the presence of the drilling microchip (200) in the detection range (512) of the microchip detector (500).

The microchip detector (500) may also have an alarm (514) that will create an alert, such as a sound or a light, when the microchip detector (500) detects the indicator of the drilling microchip (200). Furthermore, the microchip detector (500) may be able to identify the number of drilling microchips (200) passing through the detection range (512) by identifying each identifier as they enter the detection range (512).

FIG. 5a shows the drilling microchip (200) recovery system when only cuttings (502) are passing through the detection range (512), and FIG. 5b shows the drilling microchip (200) recovery system when one or more drilling microchips (200) enter the detection range (512).

In FIG. 5a, the microchip detector (500) has not detected the drilling microchips (200). As such, the alarm (514) is not creating an alert, and no signal is being sent to the computer system (602) to tell the computer system (602), or a person monitoring the computer system (602), that there is a drilling microchip (200) passing thought the detection range (512) of the microchip detector (500).

In FIG. 5b the microchip detector (500) is detecting the drilling microchips (200). As such, the alarm (514) is creating an alert, and a signal is being sent to the computer system (602) to tell the computer system (602), or a person monitoring the computer system (602), that there is a drilling microchip (200) passing thought the detection range (512) of the microchip detector (500).

Once the signal is sent to the computer system (602) or the alarm (514) is seen, a person may be alerted to the presence of the drilling microchip (200) in the cuttings container. This person can then retrieve the drilling microchip (200) and extract the measured data from the drilling microchip (200).

As stated above, an interaction between the microchip detector (500) and the identifier of the drilling microchip (200) occurs in order to indicate a presence of the drilling microchip (200) in the detection range (512). In accordance with one or more embodiments, the identifier is an RFID chip (312), and the microchip detector (500) is a RFID transceiver configured to generate electrical signals.

The RFID chip (312) uses radio waves to transmit signals (digital data) from the RFID chip (312) to the RFID transceiver. The RFID technology may be passive or active. A passive RFID chip (312) does not have an internal power source or an RFID chip battery (320). A passive RFID chip (312) depends on the energy generated from the RFID transceiver and uses the RFID chip (312) antenna (318) as a power source.

Specifically, the RFID transceiver scans the detection range (512) for the RFID chip (312). It does so by generating electrical signals which are converted into electromagnetic radio-frequency energy by the antenna (318). The RFID chip (312) uses the electromagnetic radio-frequency energy to activate the RFID chip (312) to send a signal indicating the presence of the drilling microchip (200) to the RFID transceiver.

Since passive RFID technology does not depend on a source of power or an RFID chip battery (320), its life-span is unlimited. In accordance with one or more embodiments, passive RFID technology has three ranges; low frequency (30-300 kiloHertz (kHz)), high frequency (3-300 MegaHertz (MHz)), and ultra-high frequency (300 MegaHertz-3 GigaHertz (GHz)). There are also two types of passive RFID detection ranges (512): long range and short range. The long range may be between 20-30 feet (ft) and UHF (ultra-high frequency) fits into this category. The short range may be between 2-6 inches and LF (low frequency) and HF (high frequency) fit into this category.

An active RFID chip (312) uses an RFID chip battery (320) to power the RFID chip (312). The RFID chip (312) uses the energy from the RFID chip battery (320) to send a signal indicating the presence of the drilling microchip (200) to the RFID transceiver. The RFID chip battery (320) allows the RFID chip (312) to transmit data nonstop without any interruptions, even when it is not in the detection range (512) of the RFID transceiver. There are two different types of active RFID chips (312): transponders and beacons.

Transponder RFID chips (312) conserve their battery life when they are out of the detection range (512) of the RFID transceiver. Once a transponder RFID chip (312) is within the detection range (512) of the RFID transceiver, the RFID transceiver will send a signal and the transponder RFID chip (312) will send a signal back.

Beacon RFID chips (312) consistently transmits information without the need to acknowledge the RFID transceiver's electrical signals. The information may be transmitted every few seconds. Since active RFID chips (312) require to be powered by the RFID chip battery (320), their lifespan may be between 3 and 5 years. In accordance with one or more embodiments, active RFID chips (312) have two main frequencies: 433 MHz and 915 MHz. This allows for a larger detection range (512) (approximately 150 meters) in comparison to passive RFID chips (312).

In other embodiments, the microchip detector (500) is an electronic antenna configured to emit and receive electromagnetic waves, and the identifier is an electronic tag (400) that acts as a transmitter of electromagnetic waves. The electronic antenna may emit microwaves, magneto-harmonic waves, radio frequency waves, or acoustic-magnetic waves.

The electronic tag (400) is either a soft label or a hard tag that may be placed on the shell (310) of the drilling microchip (200) or be located inside of the shell (310). As the drilling microchip (200) passes by the electronic antenna, the electronic tag (400) will start to transmit pulses of electromagnetic waves and the electronic antenna will reradiate the pulses as it detects them.

When the electronic antenna receives the electromagnetic waves from the electronic tag (400), the electronic antenna has indicated the presence of the drilling microchip (200) and the alarm (514) may be triggered and/or a signal may be sent to the computer system (602). A detacher/deactivator (not pictured) acts to interrupt a circuit within the electronic tag (400) and it may be used to remove the electronic tag (400) from the drilling microchip (200). The detection range (512) for this technology may vary from a few feet to hundreds of feet and may have a large frequency range.

Figure 6:
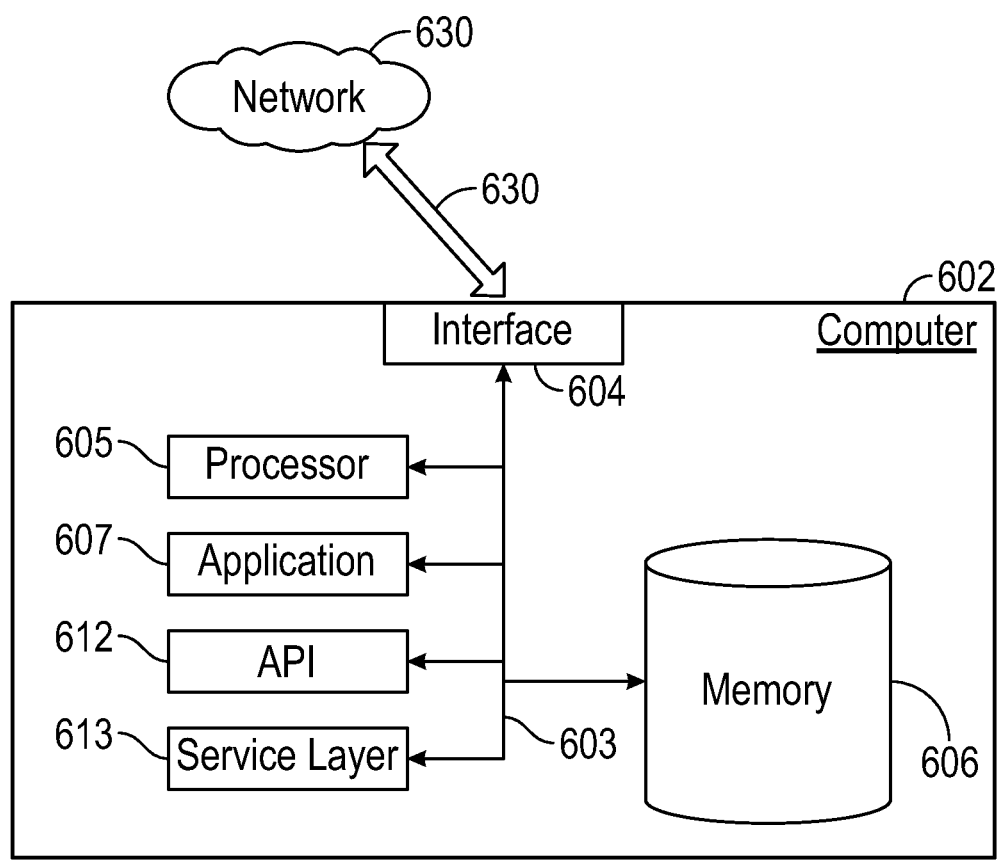
FIG. 6 shows a computer system in accordance with one or more embodiments.

FIG. 6 shows a computer (602) system in accordance with one or more embodiments. Specifically, FIG. 6 shows a block diagram of a computer (602) system used to provide computational functionalities associated with described algorithms, methods, functions, processes, flows, and procedures as described in the instant disclosure, according to an implementation. The illustrated computer (602) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device.

Additionally, the computer (602) may include a computer that includes an input device, such as a keypad, keyboard, touch screen, or other device that can accept user information, and an output device that conveys information associated with the operation of the computer (602), including digital data, visual, or audio information (104, 106) (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602).

The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or other suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or submodules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604) includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a non-transitory computer (602) readable medium, or a memory (606), that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing computer (602), each computer (602) communicating over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

Figure 7:
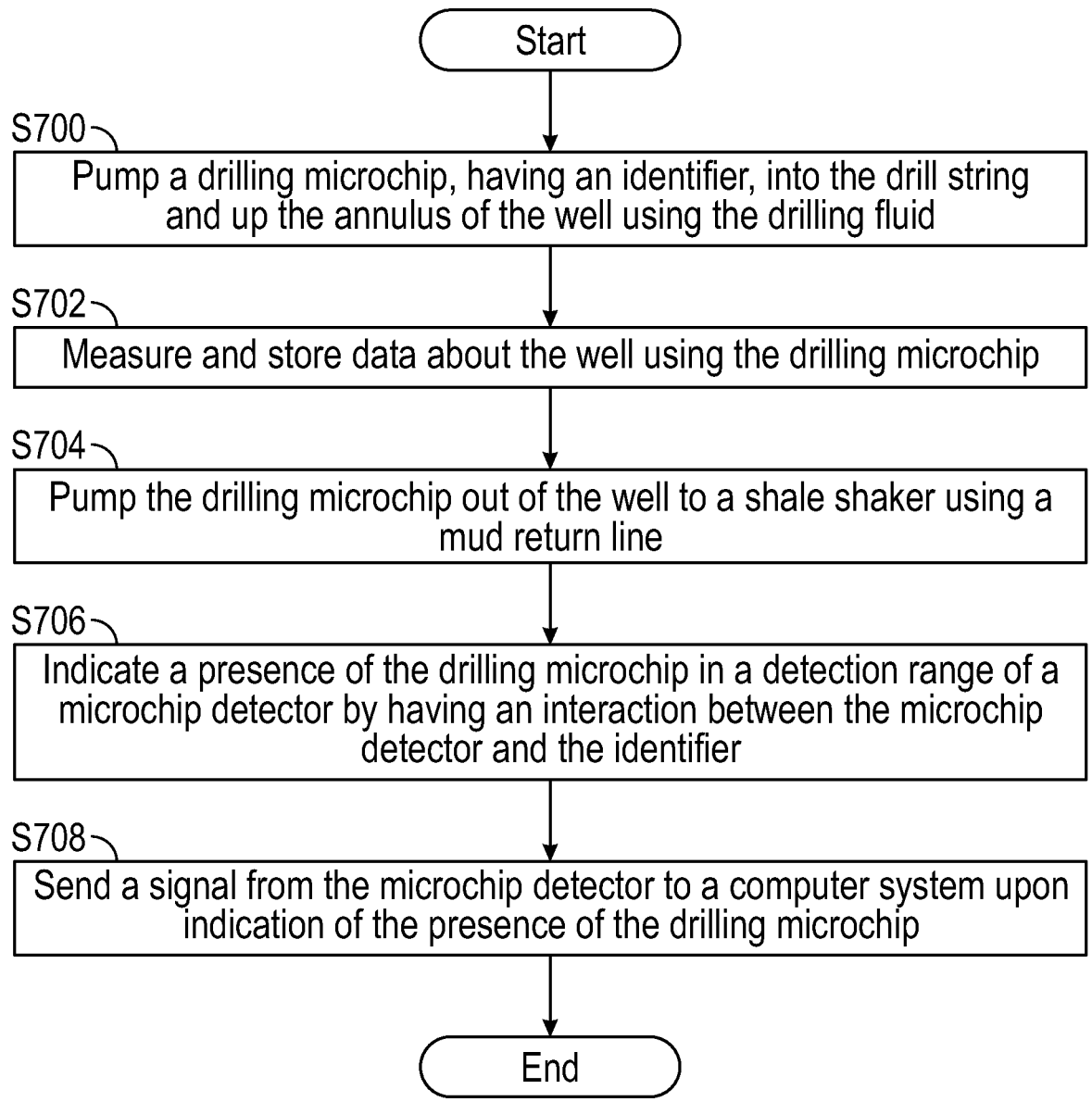
FIG. 7 shows a flowchart in accordance with one or more embodiments.

FIG. 7 shows a flowchart in accordance with one or more embodiments. The flowchart outlines a method for retrieving drilling microchips (200) from a well (202) having a drill string (108), an annulus (208), and a drilling fluid (504). While the various blocks in FIG. 7 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In step 700, a drilling microchip (200), having an identifier, is pumped into the drill string (108) and up the annulus (208) of the well (202) using the drilling fluid (504). In accordance with one or more embodiments, the drilling fluid (504) carries the drilling microchip (200) inside of the drill string (108), out the bottom of the drill string (108), through the nozzles of the drill bit (112), and up the annulus (208) of the well (202).

In step 702, data about the well (202) is measured and stored using the drilling microchip (200). As the drilling microchip (200) is carried by the drilling fluid (504), the drilling microchip (200) may use its sensors (302) to gather downhole data about the conditions in the well (202) including pressure data, temperature data, directional surveys, vibrational data, etc. Further, because the drilling microchip (200) is pumped through the entirety of the well (202), the drilling microchip (200) may take measurements at any and all depths of the well (202). The measurements may be stored on the memory (306) of the drilling microchip (200)

In step 704, the drilling microchip (200) is pumped out of the well (202) to a shale shaker (212) using a mud return line (210). The mud return line (210) is hydraulically connected to the annulus (208) of the well (202) and the shale shaker (212). The shale shaker (212) separates solids, such as cuttings (502), from the drilling fluid (504). Due to the size of the drilling microchips (200), they are also separated from the drilling fluid (504) with the cuttings (502). In order to determine when a drilling microchip (200) has exited the well (202), a microchip detector (500) is installed on the shale shaker (212).

In step 706, a presence of the drilling microchip (200) in a detection range (512) of a microchip detector (500) is indicated by having an interaction between the microchip detector (500) and the identifier. As noted above, the microchip detector (500) may be a RFID transceiver or an electronic antenna. The indicator may be a passive RFID chip (312), an active RFID chip (312), or an electronic tag (400). The RFID transceiver interacts with either the active or passive RFID chip (312) to indicate the presence of the drilling microchip (200). The electronic antenna interacts with the electronic tag (400) to indicate the presence of the drilling microchip (200).

In the passive RFID chip (312) to RFID transceiver interaction, the RFID transceiver is generating electronic signals. The antenna (318) of the passive RFID chip (312) converts the electrical signals to electromagnetic radio-frequency energy. The electromagnetic radio-frequency energy activates the passive RFID chip (312) to send a signal indicating the presence of the drilling microchip (200) to the RFID transceiver.

In the active RFID chip (312) to RFID transceiver interaction, the active RFID chip (312) comprises a battery. The active RFID chip (312) uses energy from the battery to send a signal indicating the presence of the drilling microchip (200) to the RFID transceiver. The active RFID chip (312) may be transponders or beacons. Transponder RFID chips (312) only emit the signal when they are in the detection range (512) of the RFID transceiver. Beacon RFID chips (312) constantly emit the signal and the signal is received by the RFID transceiver when the beacon RFID chip (312) is in the detection range (512).

In the electronic antenna to electronic tag (400) interaction, the electronic tag (400) acts as a transmitter of electromagnetic waves. The electronic antenna receives the electromagnetic waves from the electronic tag (400) when the electronic tag (400) is in the detection range (512). Reception of the electromagnetic waves at the electronic antenna (318) is the indicator that the drilling microchip (200) is in the detection range (512).

In step 708, a signal is sent from the microchip detector (500) to a computer system (602) upon indication of the presence of the drilling microchip (200). In further embodiments, the microchip detector (500) triggers an alarm (514). A person may use the alarm (514) or the computer system (602) to be notified of a drilling microchip (200) at the shale shaker (212). Upon notification, the person may retrieve the drilling microchip (200) from the cuttings (502) container. Further, the person may download the data from the drilling microchip (200) using the computer system (602).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed is:

1. A system for a well having a drill string, an annulus, and a drilling fluid, the system comprising:
    a drilling microchip having an identifier and configured to be pumped into the drill string and up the annulus using the drilling fluid to obtain data about the well;
    a mud return line hydraulically connected to the annulus of the well and a shale shaker;
    a microchip detector connected to the shale shaker and having a detection range, wherein the microchip detector is configured to interact with the identifier to indicate a presence of the drilling microchip in the detection range, wherein the microchip detector comprises a radio frequency identification (RFID) transceiver configured to generate electrical signals; and
    a computer system electronically connected to the microchip detector, wherein the microchip detector is configured to send a signal to the computer system upon indication of the presence of the drilling microchip.

2. The system of claim 1, wherein the identifier comprises a RFID chip having a circuit and an antenna.

3. The system of claim 2, wherein the antenna is configured to convert the electrical signals to electromagnetic radio-frequency energy.

4. The system of claim 3, wherein the RFID chip is configured to use the electromagnetic radio-frequency energy to activate the RFID chip to send a signal indicating the presence of the drilling microchip to the RFID transceiver.

5. The system of claim 2, wherein the RFID chip comprises a battery.

6. The system of claim 5, wherein the RFID chip is configured to use energy from the battery to send a signal indicating the presence of the drilling microchip to the RFID transceiver.

7. A method for a well having a drill string, an annulus, and a drilling fluid, the method comprising:
    pumping a drilling microchip, having an identifier, into the drill string and up the annulus of the well using the drilling fluid;
    measuring and storing data about the well using the drilling microchip;
    pumping the drilling microchip out of the well to a shale shaker using a mud return line;
    indicating a presence of the drilling microchip in a detection range of a microchip detector by having an interaction between the microchip detector and the identifier, wherein the microchip detector is connected to the shale shaker and comprises an RFID transceiver configured to generate electrical signals; and
    sending a signal from the microchip detector to a computer system upon indication of the presence of the drilling microchip.

8. The method of claim 7, wherein the identifier comprises a RFID chip having a circuit and an antenna.

9. The method of claim 8, wherein indicating the presence of the drilling microchip in the detection range of the microchip detector comprises converting the electrical signals to electromagnetic radio-frequency energy.

10. The method of claim 9, wherein indicating the presence of the drilling microchip in the detection range of the microchip detector comprises using the electromagnetic radio-frequency energy to activate the RFID chip to send a signal indicating the presence of the drilling microchip to the RFID transceiver.

11. The method of claim 8, wherein the RFID chip comprises a battery.

12. The method of claim 11, wherein indicating the presence of the drilling microchip in the detection range of the microchip detector comprises using energy from the battery to send a signal indicating the presence of the drilling microchip to the RFID transceiver.

13. A system for a well having a drill string, an annulus, and a drilling fluid, the system comprising:
    a drilling microchip having an identifier and configured to be pumped into the drill string and up the annulus using the drilling fluid to obtain data about the well;
    a mud return line hydraulically connected to the annulus of the well and a shale shaker;
    a microchip detector connected to the shale shaker and having a detection range, wherein the microchip detector is configured to interact with the identifier to indicate a presence of the drilling microchip in the detection range, wherein the microchip detector comprises an electronic antenna configured to emit and receive electromagnetic waves; and
    a computer system electronically connected to the microchip detector, wherein the microchip detector is configured to send a signal to the computer system upon indication of the presence of the drilling microchip.

14. The system of claim 13, wherein the identifier comprises an electronic tag configured to act as a transmitter of electromagnetic waves.

15. The system of claim 14, wherein the electronic antenna is configured to receive electromagnetic waves from the electronic tag to indicate the presence of the drilling microchip.

* * * * *